Patented Jan. 28, 1947

2,414,982

UNITED STATES PATENT OFFICE 2,414,982

METHOD OF PREPARING 2,5-DICHLORODIOXANE

William M. Smedley, Annapolis, Md.

No Drawing. Original application August 3, 1940, Serial No. 351,154. Divided and this application March 20, 1943, Serial No. 479,877

7 Claims. (Cl. 260—338)

This invention relates to the preparation of 2,5-dichlorodioxane and derivatives thereof.

This application is a division of application Serial No. 351,154, filed August 3, 1940.

The compound 2,5-dichlorodioxane has the following general formula:

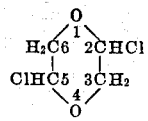

One of the objects of the invention is to provide for the first time a method of preparing this compound in commercial yields. Other objects will appear hereinafter.

It has been found in accordance with this invention that 2,5-dichlorodioxane is produced in commercial yields by the direct chlorination of dioxane at relatively low temperatures, preferably at temperatures below $+10°$ C. It has also been found that the yields increase as the temperature is decreased. At temperatures above about $+7°$ C. the yields drop below about 5%. At lower temperatures the yields increase until at $-47°$ C. yields of around 30% of 2,5-dichlorodioxane were obtained. Since the chlorination is preferably carried out in the presence of a solvent or liquid medium, the lower limit of the chlorination temperature will depend upon the availability of solvents which are liquid at the temperature of chlorination. Generally speaking, the preferred temperature of chlorination in accordance with the preferred embodiment of the invention, is within the range from about $-10°$ C. to about $-30°$ C., although in some cases the chlorination temperature may be carried as low as $-80°$ C.

The invention will be further illustrated but is not limited by the following examples, in which the quantities are stated in parts by weight unless otherwise indicated:

EXAMPLE I (a) Dioxane (100 g.; 1.14 mol; 100 cc.) was dissolved in carbon tetrachloride (159.5 g.; 1.04 mol; 100 cc.) and placed in a 500 cc. three-necked round-bottom flask equipped with condenser and mercury-sealed stirrer. Glass wool (0.2 g.) was added to create additional surface.

An ice-salt bath was used to cool the flask and contents to a temperature varying between $0°$ and $-18°$ C.

Chlorine gas (300 g.; 4.23 mols) was added continuously over a period of forty hours. The flask was then chilled in a dry ice-ether bath and filtered. The crystals collected (M. P. $117°-118°$; 52.66 g.) proved by chlorine analysis and diacetate formation to be 2,5-dichlorodioxane (yield 29.4%). Recrystallization was from chloroform.

(b) In a similar chlorination using a sintered glass disk on the chlorine inlet tube and a temperature of $-47°$ C. the yield of 2,5-dichlorodioxene was higher (59.42 g.; 33.2%). When repeated at $7°$ C. the yield dropped (6.51 g.; 0.042 mols) to 3.65%.

(c) When chloroform (100 cc.; 148.9 g.; 1.3 mols) was used as a solvent in place of carbon tetrachloride in the original chlorination (a) the yield of 2,5-dichlorodioxane (58.11 g.; 0.37 mol) was slightly increased (32.4%).

The structure of the 2,5-dichlorodioxane was proved by hydrolysis and quantitative conversion of the resulting glycol aldehyde to the p-nitrophenylosazone of glycol aldehyde. The structure of the compound was further proved to be 2,5-dichlorodioxane by its conversion to 2,5-diacetoxydioxane. Monochlorodioxane and other chlorinated dioxanes were found in the reaction product in smaller amounts. In all chlorinations resulting in the formation of 2,5-dichlorodioxane very little hydrogen chloride appeared to escape from the reaction vessel apparently due to the use of the low temperature. It appears to be important, therefore, to carry out the reaction at a temperature sufficiently low to prevent the splitting out of hydrogen chloride in any substantial amount.

The role of the solvent is not necessarily a passive one. At the low temperatures used the solubility of the hydrogen halide in the solvent may become quite large, thus increasing the concentration of the hydrogen halide in the reaction and depressing the formation of dioxene and hence the formation of 2,3-dichlorodioxane.

The 2,5-dichlorodioxane obtained as in Example I, when recrystallized from chloroform or petroleum ether, melted at $117°-118°$ C. The white needle-like crystals thus obtained when thoroughly freed of solvent, showed very little evidence of decomposition below $0°$ C. The compound reacted with bromine in carbon tetrachloride solution to give a new compound, as yet unidentified.

The chlorination of 2,5-dichlorodioxane in various solvents resulted in the formation of small amounts of symmetrical tetrachlorodioxane.

The following example will illustrate the preparation of a 2,5-di-substituted-dioxane from 2,5-dichlorodioxane:

EXAMPLE II

PREPARATION OF 2,5-DIPHENYLDIOXANE

A. *Preparation of phenylmagnesium bromide*

(a) Magnesium turnings (4.86 g.; 0.2 mol) were placed in a 500 cc. round-bottom three-necked flask, equipped with mercury-sealed stirrer, separatory funnel, condenser and activated anhydrous calcium sulfate tube. The flask was heated to $125°$ for two hours (with no flow water in the condenser) and allowed to cool to room temperature. Bromobenzene (37.7 g.; 0.24 mol) in dry ether (100 cc.) was added slowly through the separatory funnel. A vigorous reaction commenced immediately. Occasional cooling was necessary to control the reaction rate. After the reaction had ceased additional dry ether (100 cc.) was added to further dilute the phenylmagnesium bromide.

B. *Synthesis of 2,5-diphenyldioxane*

(a) Recrystallized 2,5-dichlorodioxane (12 g.; 0.0765 mol) was added cautiously in form of powdered crystals, to the ethereal solution of phenylmagnesium bromide. After all action had ceased the reaction mixture was decomposed with acidified water at 0° C. and the ethereal layer separated and dried over activated calcium sulfate. Evaporation of the ether under reduced pressure gave crystals melting 114°–147°.

After one recrystallization from alcohol the compound melted at 147°–152°. The compound was obtained in the pure state after three recrystallizations from ethyl alcohol (95%) and one from dry ether, M. P. 173.5°. Yield (12.5 g.; .052 mol) 68.1%.

Analysis: Calculated for $C_{16}H_{16}O_2$—mol. wt. 240.13 C 80.0, H 6.68; found—239.7 C 79.96, H 6.86.

C. *Study of the structure*

(a) Attempt hydrolysis. When dissolved in benzene (50 cc.) and refluxed with 1% potassium hydroxide solution (50 cc.) 2,5-diphenyldioxane (1 g.) did not hydrolyze appreciably in twelve hours. Most of the 2,5-diphenyldioxane (0.92 g.) was recovered from the benzene layer.

(b) Attempt preparation of picrate. Saturated alcoholic solutions of 2,5-diphenyldioxane and picric acid were mixed. There was no appreciable reaction. Partial evaporation of solvent after two days resulted in the precipitation of 2,5-diphenyldioxane.

(c) General tests: Neither a glacial acetic acid solution nor an acidified alcoholic solution of 2,5-diphenyldioxane gave color reactions.

It will be recognized that many other 2,5-disubstituted-dioxanes may be prepared from 2,5-dichlorodioxane by replacement of the chlorine groups with other well known radicals, or groups, as, for example, alkyl groups, for instance, methyl, ethyl, propyl, butyl, hexyl, octyl, decyl, undecyl, lauryl, myristyl, cetyl, oleyl and other saturated and unsaturated aliphatic groups. Other 2,5-diaryldioxanes may be prepared, as, for instance, the tolyl, xylyl and naphthyl derivatives. The chlorine atoms of the 2,5-dichlorodioxane may also be replaced by substituted amino groups to form 2,5-di(amino substituted)-dioxanes. The chlorine atoms of the 2,5-dichlorodioxane may also be replaced by acyl groups, as, for instance, acetyl, lauroyl, benzoyl, cinnamoyl and other acyl groups. It is thus apparent that the preparation of 2,5-dichlorodioxane opens up an entirely new field by the preparation of its derivatives. Some of these derivatives form polymers or resinous products.

In the chlorination of dioxane to form 2,5-dichlorodioxane directly it is desirable to employ a liquid reaction medium which is a solvent for chlorine and which at the same time is substantially inert to chlorine. Good results have been obtained by the use of chlorinated hydrocarbons, e. g., carbon tetrachloride, chloroform and ethylene chloride, and other hydrocarbons which are substantially inert under the conditions of the reaction, e. g., petroleum ether. It will be understood, however, that other solvents may be employed. The solvent used may be a solvent both for chlorine and the reaction product, or it may be a solvent for the one and not the other. The chlorination may also be carried out without a solvent but the yields obtained have not been as high.

The amounts of chlorine employed in carrying out the halogenation may vary but should preferably be at least chemically equivalent to the amount of chlorine present in the desired product.

In the examples previously given, the direct chlorination of dioxane was carried out at atmospheric pressures. It will be understood, however, that superatmospheric pressures may be employed and are advantageous in increasing the concentration of hydrogen chloride in the reaction mixture.

While the invention is preferably carried out by using free chlorine as the chlorinating agent, it will be understood that other chlorinating agents may be used, as, for example, mixtures of chlorine and hydrogen chloride, sulfur monochloride and sulfuryl chloride ($SO_2Cl_2$). The reaction may be carried out either as a batch or a continuous operation.

In practicing the invention, where the 2,5-dichlorodioxane is to be used as an intermediate for another reaction, it is not essential that it be isolated from the reaction mixture. For instance, in the preparation of the sym, tetrachloro derivative of dioxane, the chlorination may be continued at a higher temperature. The compound dioxadiene has also been prepared by adding directly to the reaction mixture containing the 2,5-dichlorodioxane without an isolation step, a basic dehydrohalogenating agent such as, for example, a weakly basic amine capable of splitting off the hydrogen chloride without causing substantial polymerization.

Having thus described the invention, what I claim as new and desire to secure by Letters Patent of the United States is:

1. A method of preparing 2,5-dichlorodioxane which comprises chlorinating dioxane directly at temperatures below 10° C.

2. A method of preparing 2,5-dichlorodioxane which comprises chlorinating dioxane directly with free chlorine in a solvent at temperatures below 10° C.

3. A method of preparing 2,5-dichlorodioxane which comprises directly chlorinating dioxane in a solvent medium at a temperature within the range from about +10° C. to about −80° C.

4. A method of preparing 2,5-dichlorodioxane which comprises directly chlorinating dioxane in a solvent medium at a temperature within the range from about −10° C. to about −30° C.

5. A method of preparing 2,5-dichlorodioxane which comprises directly chlorinating dioxane in a chlorinated hydrocarbon solvent at a temperature below about +10° C.

6. A method of preparing 2,5-dichlorodioxane which comprises directly chlorinating dioxane in a chlorinated hydrocarbon solvent at a temperature below 10° C.

7. A method of preparing 2,5-dichlorodioxane which comprises directly chlorinating dioxane with free chlorine in a chlorinated hydrocarbon solvent at a temperature below 10° C.

WILLIAM M. SMEDLEY.